United States Patent

Rauch et al.

[11] Patent Number: 5,818,892
[45] Date of Patent: Oct. 6, 1998

[54] SYSTEM AND METHOD FOR CONTROLLING CONTROL RODS OF A NUCLEAR POWER PLANT

[75] Inventors: Godehard Rauch, Rodgau; Joachim Schulze, Frankfurt am Main, both of Germany

[73] Assignee: Siemens Aktiengesellschaft, Munich, Germany

[21] Appl. No.: 871,332

[22] Filed: Jun. 9, 1997

Related U.S. Application Data

[63] Continuation of PCT/DE95/01762 Dec. 8, 1995 published as WO96/18195 Jun. 13, 1996.

[30] Foreign Application Priority Data

Dec. 8, 1994 [DE] Germany .................. 44 43 746.3

[51] Int. Cl.[6] .................................................. G21C 7/12
[52] U.S. Cl. ............................................ 376/215; 376/237
[58] Field of Search ................................ 376/215, 216, 376/217, 236, 237, 239, 258, 259

[56] References Cited

U.S. PATENT DOCUMENTS

| 4,717,528 | 1/1988 | Meyer et al. | 376/237 |
| 5,217,678 | 6/1993 | Fudasawa | 376/237 |

FOREIGN PATENT DOCUMENTS

0326267A2  8/1989  European Pat. Off. .

*Primary Examiner*—Daniel D. Wasil
*Attorney, Agent, or Firm*—Herbert L. Lerner; Laurence A. Greenberg

[57] ABSTRACT

A system for controlling control rods which can be moved into and out of a reactor core of a nuclear power plant, includes a selector device, a monitor device and a rod control device. The selector device contains travel sequences which are selectable and defined for regulating the nuclear power plant, i.e. allocation and movement sequences of the control rods, and it transmits the selector signals allocated to each travel sequence to the rod control device. The monitor device checks the selector signals for acceptability while taking into account the structural features of the reactor core and the control rods, which are allocated to the respective travel sequence, in particular proximity relationships of the control rods. If the selector signals are acceptable, an enable signal is transmitted to the rod control device and the rod control device induces a displacement of the control rods according to the selector signals. From the point of view of process control, the selector device and the monitor device are separate from each other so that the system and method have a high degree of reliability which corresponds to safety regulations for nuclear power plants.

8 Claims, 3 Drawing Sheets

SYSTEM AND METHOD FOR CONTROLLING CONTROL RODS OF A NUCLEAR POWER PLANT

CROSS-REFERENCE TO RELATED APPLICATION

This application is a Continuation of application Ser. No. PCT/DE95/01762, filed Dec. 8, 1995 published as WO96/18195 Jun. 13, 1996.

BACKGROUND OF THE INVENTION

Field of the Invention

The invention relates to a system for controlling control rods which can be moved into and out of a reactor core of a nuclear power plant, in particular for a boiling water reactor, the system having a selector device and a rod control device, the selector device containing travel sequences which are selectable and defined for regulating the nuclear power plant, i.e. allocation and movement sequences of the control rods for each predetermined control operation, and the selector device transmitting selector signals to the rod control device, according to a respectively requested travel sequence. The invention also relates to a method for controlling the control rods.

In general, the power output of a nuclear power plant is regulated by using control rods which are moved into or out of the reactor core of the nuclear power plant. For that purpose, the control rods are distributed over the cross section of the nuclear reactor and have a neutron-absorbing material, through the use of which the control of a nuclear chain reaction is ensured. Controlling and regulating the nuclear chain reaction achieves a corresponding regulation of the thermal power of the nuclear power plant. In order to achieve maximally precise and uniform regulation of the thermal power, while taking reactor safety into account, in particular avoiding local overheating, etc., the control rods are combined to form groups, such as is described in U.S. Pat. No. 4,717,528, for example. The groups are moved by a predetermined amount in a plurality of sequential steps, that are established beforehand or determined in real time. The combination of the control rods into groups and the setting of the movement of the respective groups is referred to as a travel sequence. Up to 200 travel sequences or more are executed by way of example, from startup of the nuclear power plant, i.e. from the beginning of the nuclear chain reaction until the full output power is achieved. In order to execute the travel sequences, a selector device, which is also referred to as a control rod travel computer, is provided for transmitting corresponding selector signals to a rod control device. If a travel command, which is transmitted from a power station control system or from operating personnel to the rod control device, is present at the same time as an enable signal, the selector signals are transmitted to a control rod drive and the control rods are moved according to the setting of the current travel sequence. U.S. Pat. No. 4,717,528 relates to a system for controlling and driving control rods of a pressurized water nuclear power plant. The system has a main computer which is composed of five subsidiary computers. The main computer is used to determine a displacement pattern for the control rods which is optimum for operation of the nuclear power plant, with the aid of physical conditions in the reactor pressure vessel of the pressurized water nuclear power plant, such as burnup of the fuel elements, local neutron flux density and local power. That optimum displacement pattern is periodically updated. The main computer is connected through a bus system (control rod logic bus controller) to the respective control rod drive devices. A respective electrical signal for controlling the respective drive device is transmitted through the bus system with the aid of the optimum control rod distribution calculated by the main computer. A respective drive device has different electrical gripper coils, on one hand for holding the control rods and, on the other hand, for displacing them. The electrical gripper coils are fitted in a housing. Both the drive device and the electrical signal transmission may be constructed to be redundant. A so-called safety bus is provided for redundancy and reliability of the signal transmission.

In addition to operating functions, a selector device for controlling the control rods may also be significant in terms of safety technology since, on one hand, in the event of malfunctions it may constitute a possible cause of unacceptable disruption to the power distribution and the power level in the reactor core and, on the other hand, it serves as a system for power reduction in the event of operating faults (emergency shutdown system). The operating functions can be divided into three substantially independent categories, namely selection and deselection of control rods according to a predeterminable travel sequence on demand from the reactor control system and/or the operating personnel. That also includes monitoring the rod position for agreement with the current travel sequence. A further operating function may be formed of as complete as possible monitoring of its own correct functioning (self-monitoring) and the functional integrity of peripheral devices such as signal input and signal output devices or measuring instruments for determining the position of the control rods. If a fault is detected, the selector device, i.e. the control rod travel computer, can be disconnected automatically from the power regulation process. Possibly faulty selector signals thereby do not have an effect in the rod control device. Such a disabling of the selector signals if faults occur is referred to as failsafe operation. The third function included in the selector device is often logging messages from the control rod drive system, in particular logging the insertion times of each rod in the event of emergency shutdown of the nuclear power plant, in particular with a boiling water reactor. Monitoring of the insertion times requires the evaluation of a large number of signals, some of which are also required for the selection and deselection of control rods, so that monitoring function could also be undertaken by the selector device.

SUMMARY OF THE INVENTION

It is accordingly an object of the invention to provide a system and a method for controlling control rods of a nuclear power plant, which overcome the hereinafore-mentioned disadvantages of the heretofore-known systems and methods of this general type and in which operating functions are separated from one another and are fulfilled by separate devices, with the intention being, in particular, to correct functioning of a selector device to be monitored substantially independently of its central processor unit.

With the foregoing and other objects in view there is provided, in accordance with the invention, a system for controlling control rods to be moved into and out of a reactor core in a nuclear power plant, comprising a selector device containing individually selectable travel sequences defined for regulating the nuclear power plant, i.e. allocation and movement sequences of the control rods for each predetermined control operation, the selector device transmitting selector signals allocated to a respectively selected travel sequence; a monitor device taking into account structural features of the reactor core and the control rods allocated to the respective travel sequence, in particular proximity relationships of the control rods, the monitor device receiving and checking the selector signals for acceptability and, if acceptable, transmitting an enable signal; and a rod control device receiving the selector signals from the selector device and receiving the enable signal from the monitor device, the rod control device inducing a displacement of the control rods according to the selector signals in the presence of the enable signal.

Through the use of this system, selection and deselection of control rods according to a predeterminable or predefinable travel sequence is ensured upon request by the reactor control system or the operating personnel. In addition, the selector signals only become effective in the rod control device when the enable signal is present, so that failsafe operation is likewise ensured. When replacing a control rod travel computer without a separate monitoring device, little or no change is required in the associated systems, such as the rod control device and the power station control room, so that, in addition, operation by the operating personnel remains substantially unchanged. The space required for the system according to the invention is the same or even less than that required for the systems existing to date, with greater availability also being provided. The insertion time of the control rods, in the event of an emergency shutdown, can be monitored simply by a separate device. The invention makes certain, in a completely novel and different way, that if the selector device malfunctions, possibly faulty safety-relevant selector signals remain ineffective in the rod control device, thus ensuring failsafe operation. A prior control rod travel computer may be replaced, during upgrading, by a selector device which contains essentially the operating functional features and the essential safety-related structural features of the prior control rod travel computer, in particular self-monitoring, and in addition a separate monitoring device. The monitoring device checks the selector signals from the selector device for agreement with a monitoring algorithm and the requirements from the power regulation process. In the event of agreement, it outputs a dynamic enable signal, or otherwise, by blocking the enable signal, it prevents activation of the selector signals in the rod control device. In this context it is considered that, by definition, correct and therefore acceptable rod selector signals are selector signals, which are also referred to in brief as selection, that are implemented in the event of an existing requirement from the power station control system or the operating personnel according to the predetermined travel sequence.

In order to reliably avoid unacceptable selections, so-called misselections, which are safety-relevant and, in particular, cause intolerable loads on the fuel elements contained in the reactor core when the control rods are displaced, it is not strictly necessary for each slight deviation of the movement of the control rods from the predetermined travel sequence to be detected. Instead, the monitor device is intended to ensure that no safety-relevant misselections become effective. By virtue of the monitoring, which is separate from the selection, it is not therefore the absolute agreement between the selection and the travel sequence which is tested but rather the adherence to properties of the travel sequence. One property of a real travel sequence resides in its structure, which must in turn be physically meaningful. The structural features derived from the structure are, primarily, proximity relationships of the selected control rods, sequences of proximity relationships, and time conditions. The effectiveness of the monitoring increases as the number of structural features incorporated in the monitoring increases, and the complexity of the adjusting criteria increases. When a new travel sequence is input into the selector device, a set of structural features of the corresponding travel sequence can be transmitted from the selector device to the monitor device. In the monitor device, the selector signal for the control rods is checked for adherence to these structural features and further features. If the predetermined features are adhered to, a dynamic enable signal which, for example, is cyclically generated, is transmitted to the rod control device. When a fault is detected, the enable signal is blocked, which disables the enable signal in the rod control device.

The selector device, with the operating functions of a control rod travel computer for selecting control rods, and the monitor device, act separately from each other since there is a different process technology formulation, with different input signals, output signals and program structures, for each of them. By way of example, the selector device receives analog input signals which characterize the rod position, and it outputs static output signals to the rod control device, which are applied during the movement of the control rods to a predetermined rod position. Use is made of the predetermined travel sequences as comparison values for this purpose. The program structure is used to compare the input signals with the predetermined travel sequence. In contrast, by way of example, the monitor device receives binary input signals, in particular selector signals and/or signals of the structural features of a travel sequence, in particular from the selector device or the rod control device. The output signal which is transmitted is a dynamic, in particular cyclically generated, enable signal. Use is made of the structure of the travel sequence rather than the travel sequence itself as comparison values. Accordingly, the program structure is constructed for comparison of the structural features of the travel sequence. The separate checking of the selector signals by checking structural properties of the travel sequences, i.e. of the reactor core and the control rods, in addition to determining malfunctions of the selector device, is also suitable for detecting the effects of errors in the predetermined travel sequence.

Additional diversity may result from the use of different operating systems, different programming languages, different compilers or assemblers, different hardware system structures and different devices. To this end, in particular, diverse control systems with different hardware and software components are suitable. By virtue of the fact that the selector device is separate from the monitor device, the system for controlling the control rods is provided with high safety reliability, which can be increased even further by using different hardware and software components for the selector device and the monitor device. This is particularly valid if it can be assumed that there are only statistical errors in the hardware and software components or that systematic errors do not have a simultaneous effect but rather a statistical effect.

In accordance with another feature of the invention, the selector device, the control rod travel computer and/or the monitor device have at least two redundant processors, which are each constructed to perform the same task. In this case, only one of the redundant processors is active, in so far as only this active processor (master processor) carries out full data processing according to its task and forwards the result of the data processing. The other processor (reserve processor) is either fully inactive or blocked in such a way that only the signals from the active processor are further processed. If the active processor malfunctions, which may, for example, be detected by self-monitoring, this processor is deactivated and a heretofore redundant processor is activated. The latter undertakes the required data processing. This redundancy principle is referred to as the master/reserve principle, wherein a master processor is active and a reserve processor is available as a replacement if the master processor malfunctions or fails completely. The master/reserve principle for the selector device and/or the monitor device is particularly advantageous if the corresponding device is constructed as a single-channel system with one input channel and one output channel. It has been shown with the selector devices used heretofore, the so-called control rod travel computers, that the decisive factor for their availability is not the reliability of the hardware or software, but the sensitivity of the monitor algorithms and the reliability of the peripheral devices included in the monitoring, in particular a measuring instrument for the control rod position and the control rod actuators, including the associated electrical and control components. A redundant configuration of the processors therefore preferably is formed of a master processor and a reserve processor. The availability can be increased by using reliable peripherals and a redundant configuration of the peripheral devices. The signals characterizing the rod position are input, for example, through multiplexers, output/input modules or coupling to a data transmission system present in the plant.

With the objects of the invention in view there is also provided a method for controlling control rods to be moved into and out of a reactor core of a nuclear power plant, which comprises combining movement sequences and allocation of control rods in travel sequences for storage in a selector device and availability for selection, and transmitting selector signals allocated to a selected travel sequence from the selector device to a rod control device; transmitting the selector signals to a monitor device separate from the selector device, and checking the selector signals for acceptability with the aid of structural features allocated to the travel sequence; transmitting an enable signal to the rod control device if the selector signals are acceptable; and displacing the control rods according to the selector signals if the selector signals and the enable signal are simultaneously applied to the rod control device.

The fact that the selection process and the monitoring process are separate ensures high safety reliability and permits monitoring independently of the central processor unit of the selector device. The method is simple to employ even in already existing nuclear power plants, preferably with a boiling water reactor.

Other features which are considered as characteristic for the invention are set forth in the appended claims.

Although the invention is illustrated and described herein as embodied in a system and a method for controlling control rods of a nuclear power plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
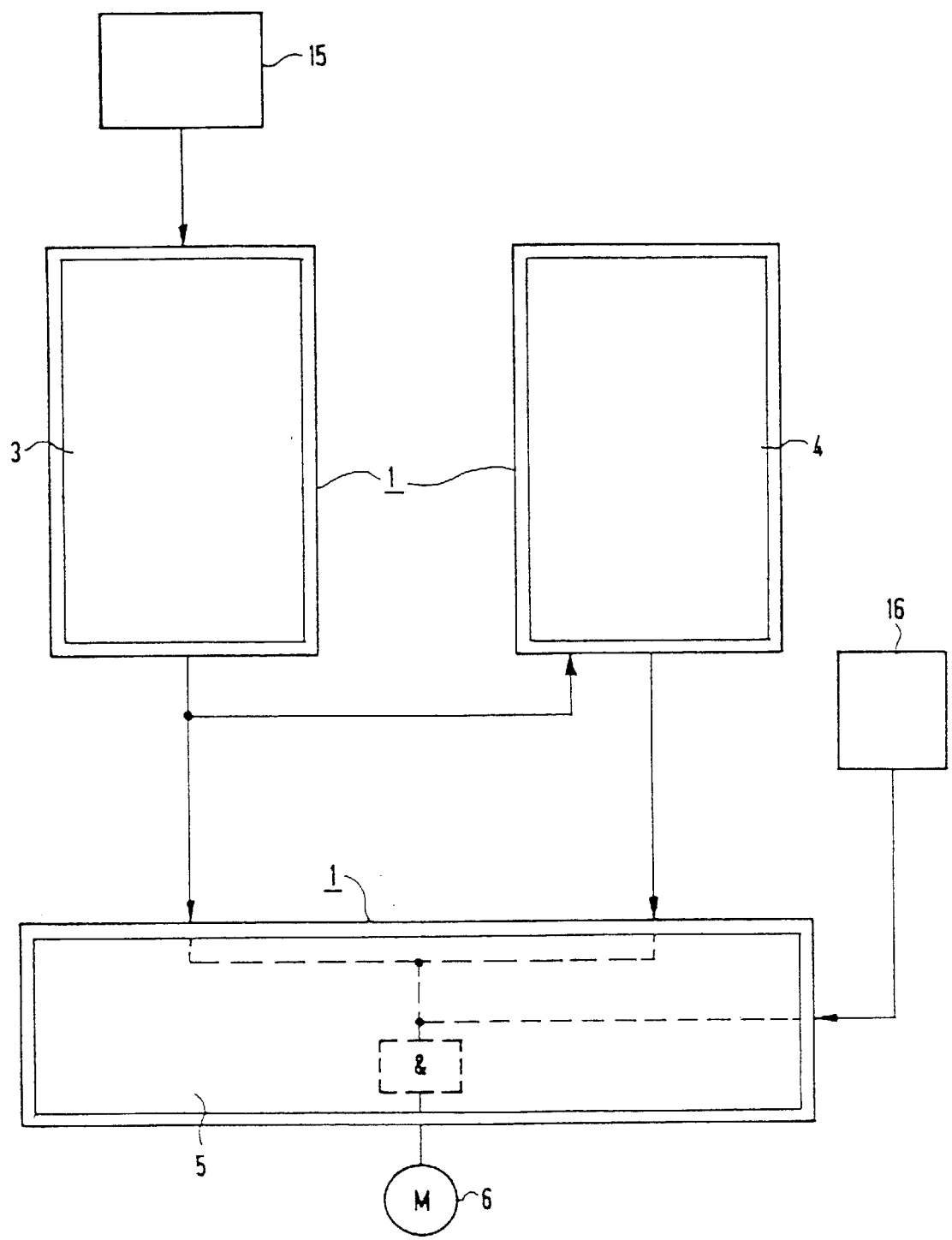
FIG. 1 is a schematic diagram of a system for controlling control rods, with a selector device and a monitor device which is separate therefrom.

Referring now to the figures of the drawings in detail and first, particularly, to FIG. 1 thereof, there is seen a schematically represented system 1 for controlling control rods of a nuclear power plant, having a selector device 3, a monitor device 4 and a rod control device 5. The selector device 3 and the monitor device 4 are each connected to the rod control device 5 and directly to each other. The selector device 3 is also connected to a measuring instrument 15 for determining a control rod position. The rod control device 5 is also connected to a reactor control system 16 and/or to a non-illustrated input device for operating personnel and a rod actuator 6 for displacing the control rods.

The rod control device 5 receives a corresponding travel command from the reactor control system 16 for moving the control rods, according to a desired change in power of the nuclear power plant. In order to execute this command, a corresponding travel sequence, i.e. for a group of control rods with an associated value of the changing position of the control rods, is output from the selector device 3 to the rod control device 5 in the form of corresponding statistical selector signals. These selector signals are applied to the rod control device 5 until the predetermined control rod position for the selected group of control rods is achieved. In order to determine how far the selected control rods have already been moved, a corresponding signal, characterizing the position of the control rods, is fed to the selector device 3 from the measuring instrument 15 for the control rod position. In order to ensure that acceptable selector signals in accordance with the travel command and the allocated travel sequence are output to the rod control unit 5 and are effective there, a set of structural features of the travel sequence is transmitted by the selector device 3 to the monitor device 4. The acceptability of the selector signals is checked with the aid of the set of structural features which, in particular, contains proximity properties of the selected control rods, time sequences of proximity relationships and time conditions. If the selector signals are evaluated as acceptable, a dynamic enable signal is transmitted from the monitor device 4 to the rod control device 5. However, if the selector signals are evaluated as unacceptable, then the enable signal is blocked, and it is thereby ensured that the possibly faulty selector signals are not transmitted from the rod control device 5 to the rod actuator device 6. This adheres to the so-called failsafe principle, in which the nuclear power plant remains in a safe state if errors occur. The system 1 has a high safety reliability due to the separation in terms of process technology, hardware and programming between the selector device 3 and the monitor device 4, and the separation of the signals generated in the devices 3, 4.

Figure 2:
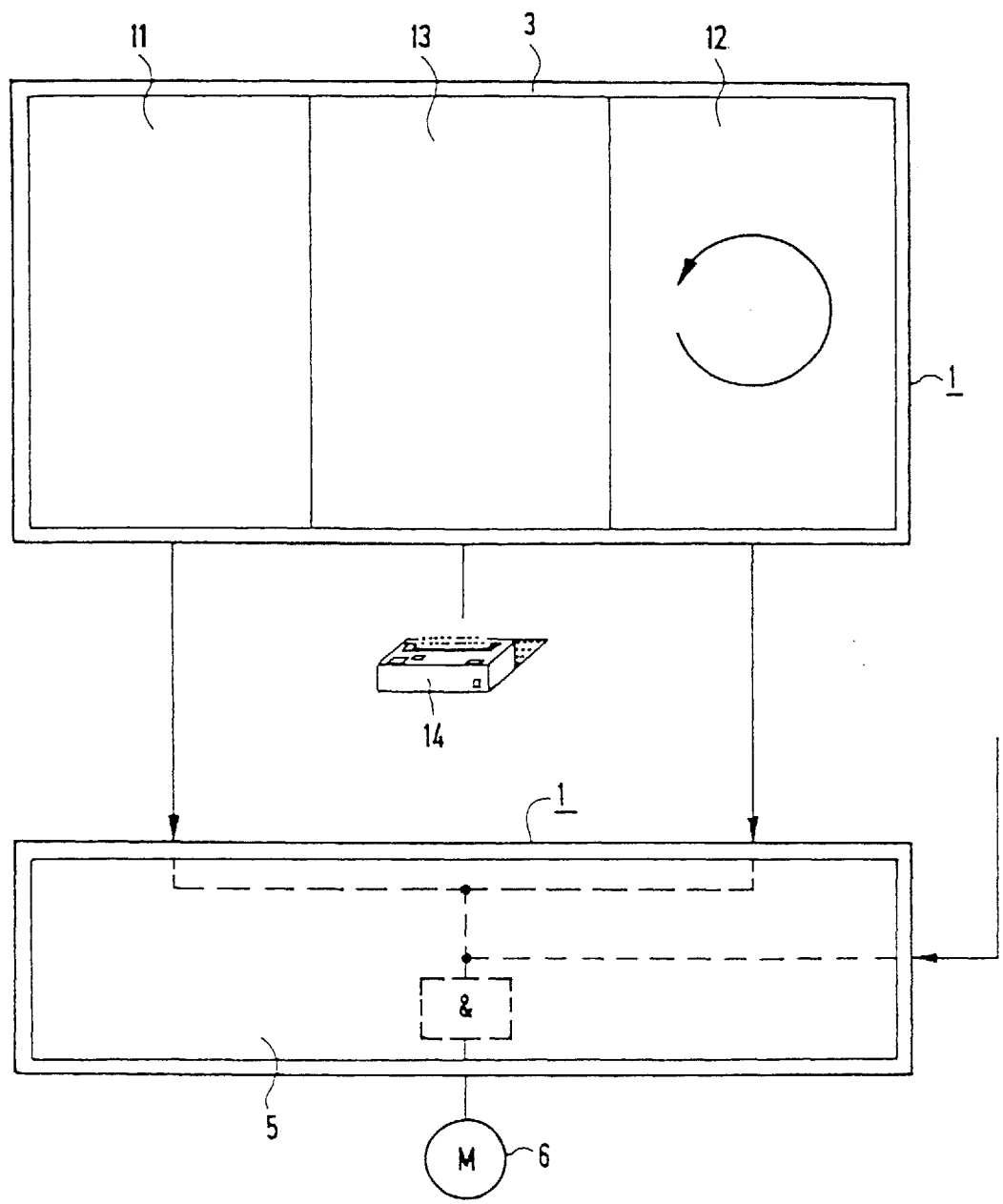
FIG. 2 is a schematic diagram of a system for controlling control rods according to the prior art.

FIG. 2 shows a prior art system 1 for controlling the control rods of a nuclear power plant. Both the selector signals for the required travel sequences and an enable signal are transmitted to a rod control device 5 from a selector device 3, which is also referred to as a control rod travel computer. The control rod travel computer 3 has a travel sequence module 11, a self-monitoring module 12 and an emergency shutdown monitoring module 13. The self-monitoring module 12 perform a functional test of a central processor unit of the travel sequence module 11. The self-monitoring module 12 is therefore quite specifically constructed for the central processor unit. When using modern processor units, extremely expensive and cost-intensive application-specific developments would be necessary to that end, with the possibility that a generally applicable demonstration of the effectiveness of the self-monitoring module 12 could not be provided because of the complexity of modern processor units. The complete travel sequence and the associated selector signals are checked for full agreement by the self-monitoring module 12. In contrast, the invention avoids such expensive complete checking, by using structural features of the respective travel sequence to check the selector signals and reliably detect those selector signals which are unacceptable and safety-relevant.

The emergency shutdown monitoring module 13 of the selector device 3 according to FIG. 2 is connected to a logging device 14, in particular a printer. The insertion times of the control rods into the reactor core and further signals arising in this context are logged in the event of an emergency shutdown, through the use of the logging device 14.

Figure 3:
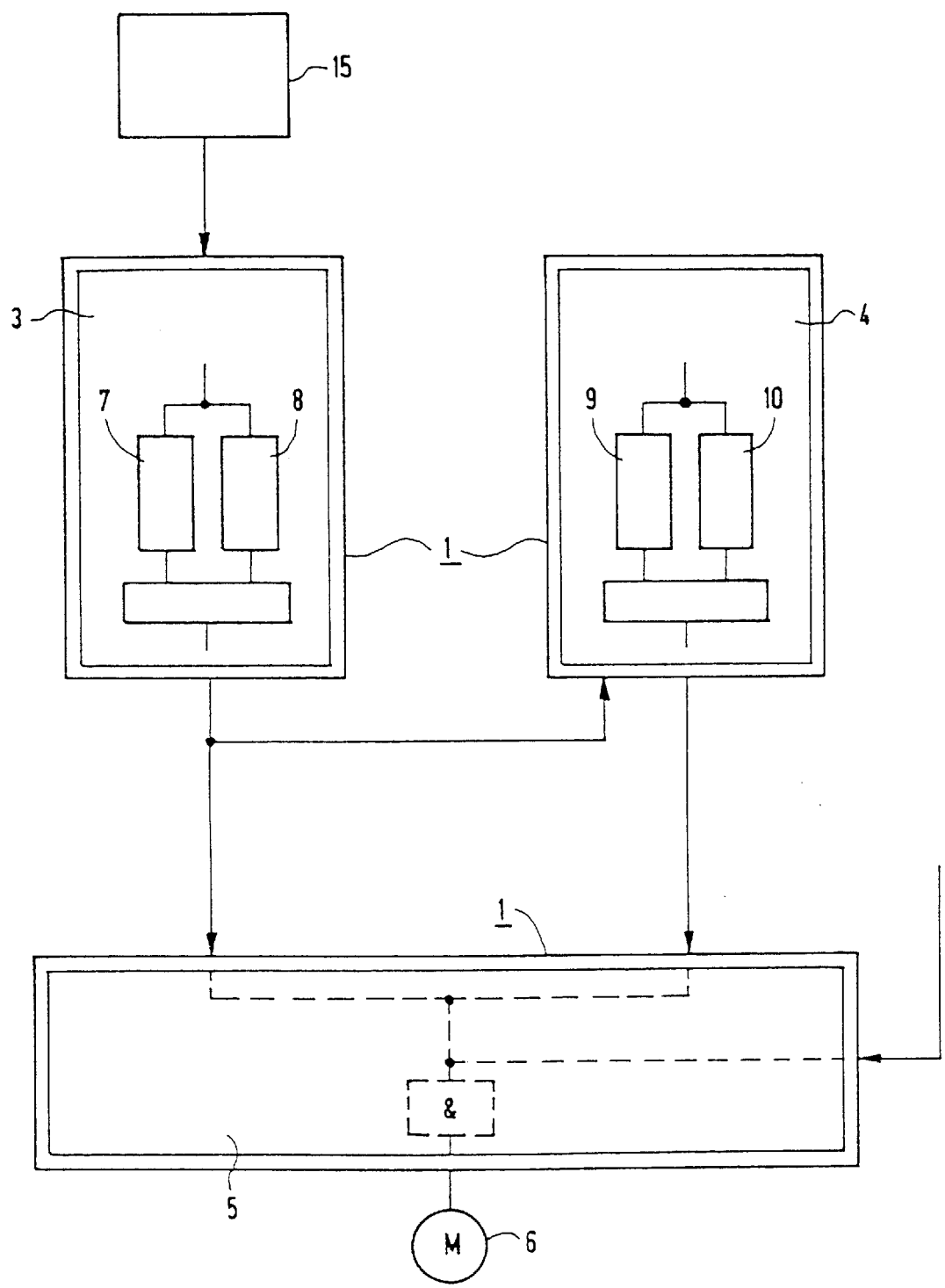
FIG. 3 is a schematic diagram of a system for controlling control rods, with a redundantly configured selector device and a redundantly configured monitor device.

FIG. 3 shows a system 1 for controlling the control rods, which is similar to FIG. 1. The same reference symbols are used for the same elements. In addition to the system 1 represented in FIG. 1, both the selector device 3 and the monitor device 4 each contain two processors 7, 8 and 9, 10, respectively, which are mutually redundant. The processors 7 and 9 are master processors and the processors 8 and 10 are reserve processors. The same input signals are respectively applied to the processors 7, 8 of the selector device 3, but in normal operation only the output signals of the master processor 7 are transmitted to the rod control device 5 or the monitor device 4. The reserve processor 8 is in a standby mode in normal operation. If the master processor 7 malfunctions, which, for example, is detected by programmed self-monitoring, the master processor 7 is deactivated and the reserve processor 8 is fully activated, so that the corresponding output signals are from then on transmitted from the reserve processor 8 to the rod control device 5 or the monitor device 4. The master processor 9 and the reserve processor 10 of the monitor device 4 are configured redundantly, in a similar manner to the processors 7, 8 of the selector device 3. By virtue of the diversity between the monitor device 4 and the selector device 3, and their redundant configuration, high reliability is ensured for the system 1 even in the case of a single-channel input and/or output for the selector device 3 and the monitor device 4.

The invention is distinguished by a system for controlling the control rods of a light water nuclear power plant, in particular with a boiling water reactor, with a selector device which selects the control rods and, in addition to the prior operational functionality, also has essential features of the safety configuration of prior selector devices, so-called control rod travel computers. The system also has a monitor device which operates according to a separate algorithm from the selector device for monitoring the selector signals which are transmitted by the selector device to a rod control device, and prevents misselections from becoming effective. The reliability of the system can be increased further by using mutually different control systems and a redundant configuration for the selector device and the monitor device, which use two independent processors each. In comparison with prior systems, in the system according to the invention, monitoring of the selector signals can be defined with the aid of structural features of the movement sequences and the allocation of the control rods, which ensures simple and fast monitoring and separate monitoring which is decoupled from the central processor unit of the selector device.

We claim:

1. In a nuclear power plant having a reactor core and control rods to be moved into and out of the reactor core, a system for controlling the control rods, comprising:
    a) a selector device containing individually selectable travel sequences defined for regulating the nuclear power plant, said selector device transmitting selector signals allocated to a respectively selected travel sequence;
    b) a monitor device taking into account structural features of the reactor core and the control rods allocated to the respective travel sequence, said monitor device receiving and checking the selector signals for acceptability and, if acceptable, transmitting an enable signal; and
    c) a rod control device receiving the selector signals from said selector device and receiving the enable signal from said monitor device, said rod control device inducing a displacement of the control rods according to the selector signals in the presence of the enable signal.

2. The system according to claim 1, wherein the travel sequences of said selector device are allocation and movement sequences of the control rods for each predetermined control operation.

3. The system according to claim 1, wherein the structural features taken into account by said monitor device are proximity relationships of the control rods.

4. The system according to claim 1, wherein said selector device contains at least two independent and redundant processors for selecting the travel sequences, said processors connected together for delivering an effective output signal from only one of said processors in each case.

5. The system according to claim 4, wherein one of said processors is a master processor supplying an output signal with priority, and the other of said processors is a reserve processor to be activated for supplying an output signal with priority if the master processor malfunctions.

6. The system according to claim 1, wherein said monitor device contains at least two independent and redundant processors for checking the acceptability of the selector signals of the current travel sequences, said processors connected together for delivering an effective output signal from only one of said processors in each case.

7. The system according to claim 6, wherein one of said processors is a master processor supplying an output signal with priority, and the other of said processors is a reserve processor to be activated for supplying an output signal with priority if said master processor malfunctions.

8. A method for controlling control rods to be moved into and out of a reactor core of a nuclear power plant, which comprises:
    a) combining movement sequences and allocation of control rods in travel sequences for storage in a selector device and availability for selection, and transmitting selector signals allocated to a selected travel sequence from the selector device to a rod control device;
    b) transmitting the selector signals to a monitor device separate from the selector device, and checking the selector signals for acceptability with the aid of structural features allocated to the travel sequence;
    c) transmitting an enable signal to the rod control device if the selector signals are acceptable; and
    d) displacing the control rods according to the selector signals if the selector signals and the enable signal are simultaneously applied to the rod control device.

* * * * *